United States Patent [19]

Wainauski et al.

[11] Patent Number: 4,941,803
[45] Date of Patent: Jul. 17, 1990

[54] AIRFOILED BLADE

[75] Inventors: Harry S. Wainauski, Simsbury, Conn.; Carol M. Vaczy, Swampscott, Mass.

[73] Assignee: United Technologies Corporation, Hartford, Conn.

[21] Appl. No.: 304,676

[22] Filed: Feb. 1, 1989

[51] Int. Cl.$^5$ .............................................. B64C 11/18
[52] U.S. Cl. ............................. 416/242; 416/DIG. 2; 416/223 R; 416/237; 244/35 R
[58] Field of Search ............. 416/223 R, DIG. 2, 242, 416/243, 238; 415/181; 244/35 R, 35 A

[56] References Cited

U.S. PATENT DOCUMENTS

| 2,709,052 | 5/1955 | Berg et al. | 244/35 |
| 3,952,971 | 4/1976 | Whitcomb | 244/35 |
| 4,325,675 | 4/1982 | Gallot et al. | 416/223 |
| 4,412,664 | 11/1983 | Noonan | 244/35 |
| 4,413,796 | 11/1983 | Bousquet | 244/35 |
| 4,416,434 | 11/1983 | Thibert et al. | 244/35 |
| 4,455,003 | 6/1984 | Hilbig | 244/35 |
| 4,459,083 | 7/1984 | Bingham | 416/223 |
| 4,519,746 | 5/1985 | Wainauski et al. | 416/223 R |
| 4,564,337 | 1/1986 | Zimmer et al. | 416/223 |
| 4,569,633 | 2/1986 | Flemming | 416/228 |
| 4,611,773 | 9/1986 | Goldhammer et al. | 244/35 |
| 4,652,213 | 3/1987 | Thibert et al. | 416/223 |
| 4,720,239 | 1/1988 | Owczarek | 416/223 A |
| 4,790,724 | 12/1988 | Bousquet et al. | 416/223 R |
| 4,830,574 | 5/1989 | Wainauski et al. | 416/223 R |
| 4,834,617 | 5/1989 | Wainauski et al. | 416/DIG. 2 |

FOREIGN PATENT DOCUMENTS

| 57-38699 | 10/1981 | Japan | 416/223 R |
| 647159 | 12/1950 | United Kingdom | 416/DIG. 2 |

Primary Examiner—Robert E. Garrett
Assistant Examiner—Hoang Nguyen
Attorney, Agent, or Firm—Lloyd D. Doigan

[57] ABSTRACT

A family of airfoils for use in a high solidity factor blade having a leading edge portion and a trailing edge portion, a tip portion, and a root portion, has a plurality of airfoil sections. Each section has: one of any of a plurality of camber lines extending from the leading edge portion to the trailing edge portion, the camber lines being scalable relative to each other, each having the same relative shape, the camber lines having a minimal slope from the leading edge to about a 40% chord and an apogee at about a 74% chord; a scalable thickness ratio of between about 2% to about 7.5%; and, a maximum thickness position which is located from about a 37.5% chord for an airfoil at the tip portion of the blade to about a 35.0% chord for an airfoil at the root portion of the blade.

7 Claims, 6 Drawing Sheets

AIRFOILED BLADE

TECHNICAL FIELD

This invention relates to a propeller blade and more particularly to a propeller blade comprised of a new family of airfoils.

BACKGROUND ART

Some propellers, such as the prop fan, utilize thin, high solidity factor blades. The shape of the airfoils defining the blades allow high power loading with minimized compressibility losses. For instance, the prop fan blades manufactured by the Hamilton Standard Division of the United Technologies Corporation each have a power loading of approximately 37.5 shp/d. Such thin blades allow a prop fan propeller to achieve a peak efficiency of over 80% at a 0.8 flight Mach number, a tip speed of 800 feet per second, and an altitude of 35,000 feet.

The blades must be designed to perform reliably at such high tip speeds and Mach numbers. However, thin blades comprised of, for instance, NACA Series 16 airfoils have several design constraints. The shape of the leading edge of such airfoils makes a blade susceptible to foreign object damage. The shape of the trailing edge makes the blade very difficult to handle. The thin nature of the blade makes the blade difficult to construct.

U.S. Pat. No. 4,834,617 to Wainauski et al entitled "Airfoiled Blade" (commonly owned by the assignee herein and hereby incorporated by reference) shows a propeller blade having a plurality of particular airfoil sections. Such a propeller blade is relatively easy to handle, has a leading edge which is less susceptible to foreign object damage and is thicker to allow relative ease of construction. Moreover, the propeller blade disclosed in Wainauski performs within the desired flight envelope achieving the desired power loading and achieving the desired efficiency. However, the camber and thickness of the particular airfoil sections may not be modified for other flight envelopes in which such a blade may be utilized.

DISCLOSURE OF THE INVENTION

It is an object of the present invention to create a blade having a family of airfoil cross-sections that provide high loading and high efficiency at relatively high Mach numbers.

It is an object of the present invention to create a blade having a family of airfoil cross-sections that may be utilized for various flight envelopes.

It is an object of the invention to create a blade having a family of airfoil cross-sections that are less susceptible to foreign object damage.

It is an object of the invention to create a blade having a family of airfoil cross-sections that are easy to handle and construct.

According to the invention, a family of airfoils for use in a high solidity factor blade having a leading edge portion and a trailing edge portion, a tip portion, and a root portion, has a plurality of sections. Each section has: one of any of a plurality of camber lines extending from the leading edge portion to the trailing edge portion, the camber lines being scalable relative to each other, each having the same relative shape, the camber lines having a minimal slope from the leading edge to about a 40% chord and an apogee at about a 74% chord; a scalable thickness ratio of between about 2% to about 7.5%; and, a maximum thickness position which is located from about a 37.5% chord for an airfoil at the tip portion of the blade to about a 35.0% chord for an airfoil at the root portion of the blade.

According to a feature of the invention, the thickness ratio increases from about 2% for an airfoil at the tip portion of the blade to about 7.5% for an airfoil at the root portion of the blade.

According further to the invention, a blade is comprised of the family of relatively thick airfoil sections, each section having a parabolic leading edge, with a minimal camber extending to about the 40% chord, a gradual upper surface pressure recovery region from the 40% chord to the trailing edge, and a concave lower surface from the 40% chord to the trailing edge to generate the required lift. The family of airfoil sections have a thickness ratio (h/b) from 2.0 to 7.5%, a scalable camber having an apogee at about 74% chord. The position of maximum thickness of each section is located from about 37.5% chord for an airfoil positioned at the tip portion of the blade to about a 35.0% chord for an airfoil positioned at the root portion of the blade.

According to a feature of the invention, the thickness ratio increases from about 2% for an airfoil at the tip portion of the blade to about 7.5% for an airfoil at the root portion of the blade.

The airfoil family provides a high solidity factor blade which may be used to optimally provide mission profiles from Mach 0.72 to 0.85. Moreover, the novel blade of the invention provides similar aerodynamic performance to the NACA Series 16 airfoil with less susceptibility to foreign object damage, less handling problems, and less construction problems and adaptability to other mission profiles.

These and other objects, features and advantages of the present invention will become more apparent in light of the following detailed description of a best mode embodiment thereof, as illustrated in the accompanying drawing.

BEST MODE FOR CARRYING OUT THE INVENTION

Figure 1:
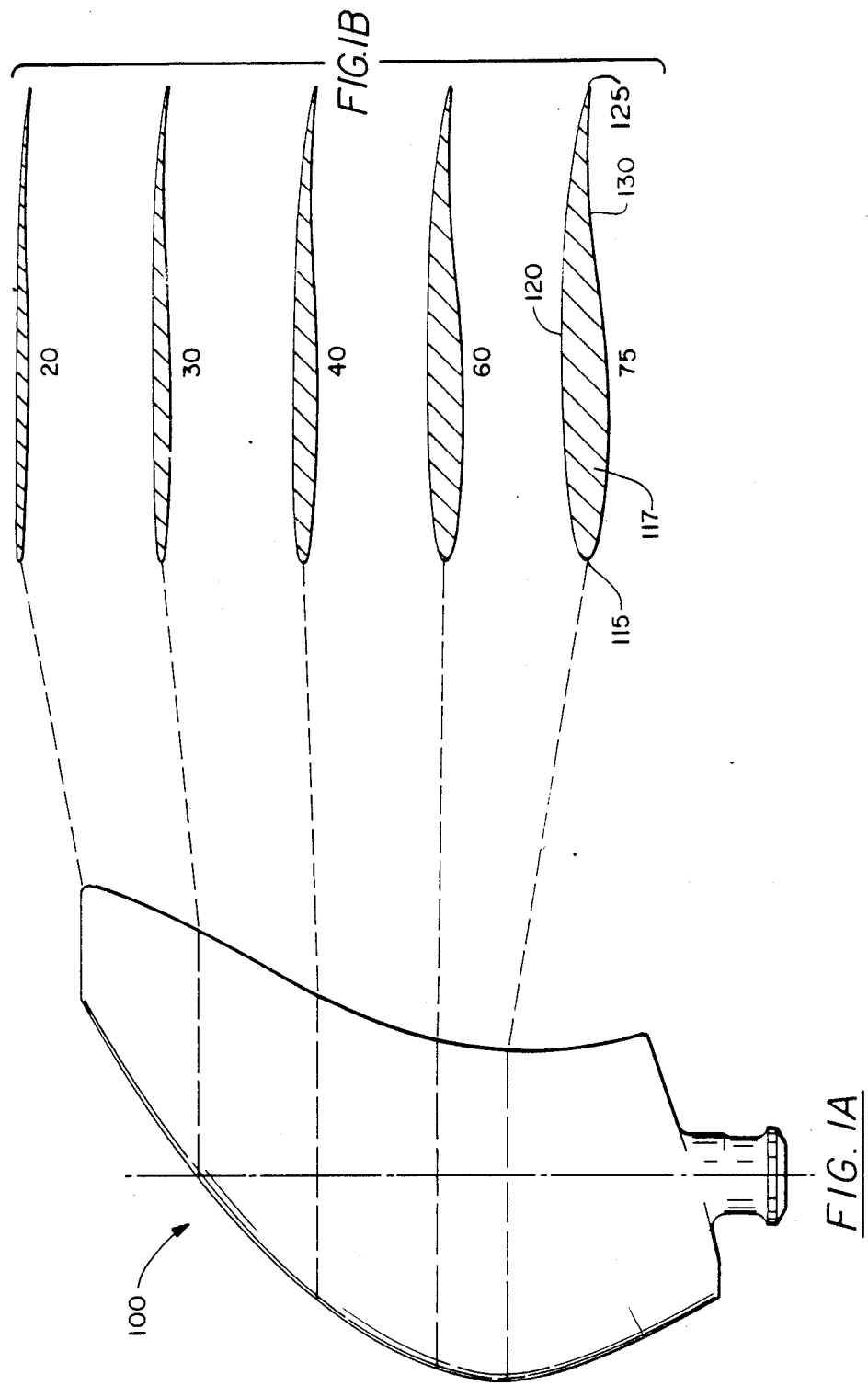
FIG. 1A is a plan view of a high solidity factor, high camber propeller blade showing exemplary locations, along a blade axis of various sections
FIG. 1B is a series of cross-sectional elevations of a plurality of airfoils of the airfoil family of the present invention, various of the airfoils being enlarged to show details of the shape thereof.
Figure 2:
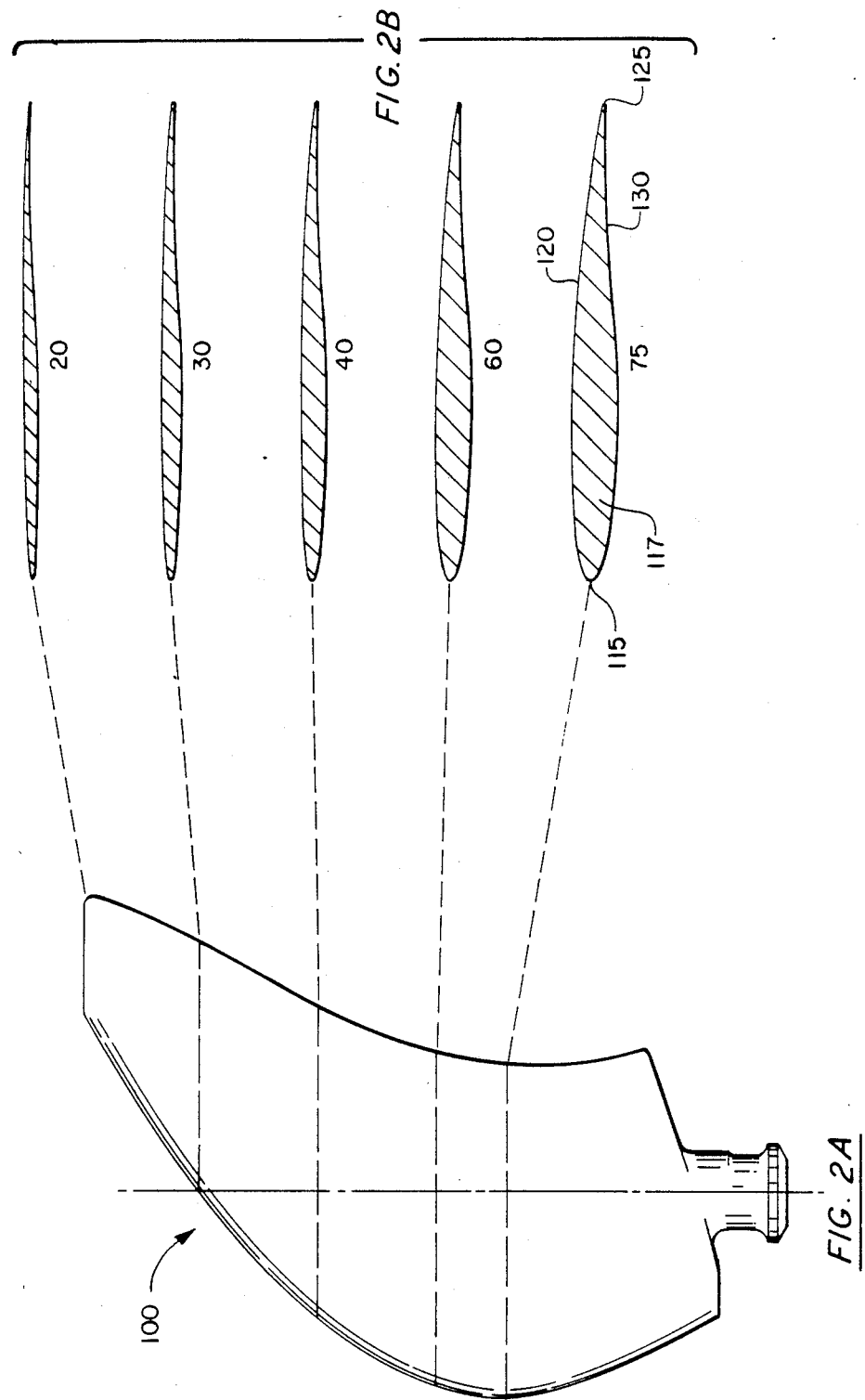
FIG. 2A is a plan view of a high solidity factor, low camber propeller blade showing exemplary locations, along a blade axis of various sections
FIG. 2B is a series of cross-sectional elevations of a plurality of airfoils of the airfoil family of the present invention, various of the airfoils being enlarged to show details of the shape thereof.

Referring to FIGS. 1B and 2B, a series of cross-sections of the airfoil blade 100 of the present invention is shown. Each cross-section is identified by inditia comprising two numerals equal to the thickness ratio (thickness/length) multiplied by 1000. Thus, for example, the upper most airfoil section 20 is characterized by a thickness ratio of 0.02, the second airfoil section 30 having a thickness ratio of 0.030, the third airfoil section having a thickness ratio of 0.040, the fourth airfoil section 60 having a thickness ratio of 0.060 and the fifth airfoil section 75 having a thickness ratio of 0.075.

Still referring to FIG. 1B, it is seen that the 20 airfoil cross-section is taken substantially at the tip of the blade. The 30 airfoil cross-section is taken at a location approximately 0.75 of the length of the blade longitudinal axis from the root portion 105 thereof. Similarly, the 40 cross-section is taken at approximately 0.65 of the length, the 60 cross-section is taken at approximately 0.45 of the length, and the 75 section is taken at approximately 0.35 of the length of the blade longitudinal axis from the root portion.

It will be understood that while the chords of the airfoil sections are illustrated as being of a common length, design considerations regarding blade taper will dictate the relative sizes of the airfoil sections and the present invention shall not be limited to any specific size relationship between the airfoil sections.

Cross-sections of the blade between the airfoil sections shown in FIGS. 1B and 2B are defined by a transition surface connecting corresponding portions between any two adjacent airfoil shapes as is well known in the art. When the airfoils are incorporated in a single propeller blade, smooth continuous upper and lower surfaces result. The airfoil cross-sections may be angularly displaced from one another in a manner well known in the art to import sufficient twist to the blade to establish varying blade angles of attack dictated by aerodynamic performance requirements.

The two following sets of tables list the precise dimensionless coordinates of a number of airfoil sections of two blades which embody the present invention. The first set of tables detail the coordinates of a high camber (i.e. relatively high lift) blade. The second set of tables detail the coordinates of a low camber (i.e. relatively low lift) blade. The x/c values are dimensionless locations on the blade chord line. The y/c upper values are the dimensionless heights from the chord line to points on a blade suction surface. The y/c lower values are the dimensionless heights from the chord line to points on a blade pressure surface.

| | HIGH CAMBER BLADE SECTION 20 | | | | |
|---|---|---|---|---|---|
| X/C | Y/C (UPPER) | Y/C (LOWER) | X/C | Y/C (UPPER) | Y/C (LOWER) |
| 0.0000000 | 0.0000000 | 0.0000000 | 0.4698770 | 0.0137496 | −0.0054413 |
| 0.0004930 | 0.0006939 | −0.0006639 | 0.4798764 | 0.0138634 | −0.0051537 |
| 0.0009901 | 0.0009644 | −0.0009265 | 0.4898759 | 0.0139812 | −0.0048501 |
| 0.0019851 | 0.0013497 | −0.0013058 | 0.4998764 | 0.0141009 | −0.0045285 |
| 0.0029822 | 0.0016433 | −0.0015935 | 0.5098758 | 0.0142217 | −0.0041919 |
| 0.0049773 | 0.0020989 | −0.0020393 | 0.5198753 | 0.0143415 | −0.0038423 |
| 0.0074724 | 0.0025441 | −0.0024666 | 0.5298758 | 0.0144642 | −0.0034797 |
| 0.0099685 | 0.0029126 | −0.0028132 | 0.5398752 | 0.0145900 | −0.0031021 |
| 0.0199570 | 0.0040067 | −0.0038000 | 0.5598751 | 0.0148316 | −0.0023188 |
| 0.0299495 | 0.0047994 | −0.0044713 | 0.5698746 | 0.0149453 | −0.0019172 |
| 0.0399430 | 0.0054361 | −0.0049786 | 0.5798751 | 0.0150561 | −0.0015086 |
| 0.0599330 | 0.0064466 | −0.0057224 | 0.5898746 | 0.0151648 | −0.0010939 |
| 0.0699283 | 0.0068643 | −0.0060128 | 0.5998750 | 0.0152695 | −0.0006773 |
| 0.0799248 | 0.0072381 | −0.0062672 | 0.6098745 | 0.0153683 | −0.0002606 |
| 0.0899224 | 0.0075769 | −0.0064946 | 0.6198749 | 0.0154570 | 0.0001501 |
| 0.0999188 | 0.0078866 | −0.0067009 | 0.6298754 | 0.0155347 | 0.0005498 |
| 0.1099163 | 0.0081733 | −0.0068883 | 0.6398759 | 0.0156003 | 0.0009375 |
| 0.1199137 | 0.0084411 | −0.0070607 | 0.6598768 | 0.0156897 | 0.0016748 |
| 0.1299112 | 0.0086938 | −0.0072161 | 0.6698772 | 0.0157094 | 0.0020185 |
| 0.1399086 | 0.0089305 | −0.0073574 | 0.6798777 | 0.0157110 | 0.0023423 |
| 0.1599056 | 0.0093690 | −0.0076052 | 0.6898791 | 0.0156947 | 0.0026420 |
| 0.1699030 | 0.0095758 | −0.0077066 | 0.6998796 | 0.0156593 | 0.0029123 |
| 0.1799015 | 0.0097745 | −0.0077959 | 0.7098311 | 0.0156019 | 0.0031535 |
| 0.1899000 | 0.0099622 | −0.0078783 | 0.7298840 | 0.0154182 | 0.0035500 |
| 0.1998985 | 0.0101420 | −0.0079507 | 0.7398854 | 0.0152898 | 0.0037037 |
| 0.2098969 | 0.0103167 | −0.0080120 | 0.7598894 | 0.0149590 | 0.0039192 |
| 0.2198954 | 0.0104895 | −0.0080594 | 0.7698917 | 0.0147556 | 0.0039800 |
| 0.2298939 | 0.0106582 | −0.0080928 | 0.7798942 | 0.0145262 | 0.0040107 |
| 0.2398933 | 0.0108230 | −0.0081162 | 0.7898967 | 0.0142719 | 0.0040124 |
| 0.2598902 | 0.0111375 | −0.0081260 | 0.7998992 | 0.0139905 | 0.0039891 |
| 0.2698898 | 0.0112892 | −0.0081123 | 0.8099016 | 0.0136822 | 0.0039403 |
| 0.2798882 | 0.0114380 | −0.0080877 | 0.8199051 | 0.0133478 | 0.0038705 |
| 0.2898877 | 0.0115817 | −0.0080521 | 0.8399119 | 0.0125991 | 0.0036613 |
| 0.2998861 | 0.0117225 | −0.0080055 | 0.8599198 | 0.0117414 | 0.0033623 |
| 0.3098856 | 0.0118622 | −0.0079459 | 0.8699243 | 0.0112710 | 0.0031800 |
| 0.3198850 | 0.0119970 | −0.0078813 | 0.8799287 | 0.0107727 | 0.0029757 |
| 0.3298835 | 0.0121247 | −0.0078076 | 0.8899332 | 0.0102463 | 0.0027434 |
| 0.3398830 | 0.0122495 | −0.0077230 | 0.8999376 | 0.0096889 | 0.0024941 |
| 0.3598819 | 0.0124950 | −0.0075218 | 0.9099430 | 0.0090974 | 0.0022023 |
| 0.3698813 | 0.0126187 | −0.0074022 | 0.9199475 | 0.0084700 | 0.0018716 |

HIGH CAMBER BLADE SECTION 20 -continued

| X/C | Y/C (UPPER) | Y/C (LOWER) | X/C | Y/C (UPPER) | Y/C (LOWER) |
|---|---|---|---|---|---|
| 0.3798803 | 0.0127405 | −0.0072706 | 0.9299539 | 0.0078006 | 0.0014944 |
| 0.3898802 | 0.0128583 | −0.0071270 | 0.9399593 | 0.0070931 | 0.0010751 |
| 0.3998797 | 0.0129731 | −0.0069684 | 0.9599723 | 0.0055762 | 0.0001325 |
| 0.4098793 | 0.0130869 | −0.0067948 | 0.9699786 | 0.0047698 | −0.0003797 |
| 0.4198787 | 0.0131986 | −0.0066092 | 0.9799851 | 0.0039294 | −0.0009160 |
| 0.4298782 | 0.0133074 | −0.0064086 | 0.9899926 | 0.0030429 | −0.0014842 |
| 0.4398776 | 0.0134172 | −0.0061930 | 1.0000000 | 0.0020955 | −0.0020955 |
| 0.4598775 | 0.0136368 | −0.0057099 | | | |

HIGH CAMBER BLADE SECTION 20

| X/C | Y/C (UPPER) | Y/C (LOWER) | X/C | Y/C (UPPER) | Y/C (LOWER) |
|---|---|---|---|---|---|
| 0.0000000 | 0.0000000 | 0.0000000 | 0.4698774 | 0.0198732 | −0.0087951 |
| 0.0004931 | 0.0010353 | −0.0009954 | 0.4798768 | 0.0200129 | −0.0083997 |
| 0.0009901 | 0.0014396 | −0.0013897 | 0.4898763 | 0.0201546 | −0.0079802 |
| 0.0019852 | 0.0020150 | −0.0019572 | 0.4998767 | 0.0202994 | −0.0075358 |
| 0.0029822 | 0.0024520 | −0.0023863 | 0.5098762 | 0.0204411 | −0.0070683 |
| 0.0049774 | 0.0031349 | −0.0030554 | 0.5198757 | 0.0205828 | −0.0065849 |
| 0.0074725 | 0.0038027 | −0.0036993 | 0.5298762 | 0.0207275 | −0.0060824 |
| 0.0099686 | 0.0043529 | −0.0042198 | 0.5398756 | 0.0208742 | −0.0055579 |
| 0.0199572 | 0.0059826 | −0.0057063 | 0.5598756 | 0.0211496 | −0.0044670 |
| 0.0299497 | 0.0071572 | −0.0067198 | 0.5698750 | 0.0212783 | −0.0039085 |
| 0.0399432 | 0.0081008 | −0.0074902 | 0.5798755 | 0.0214039 | −0.0033410 |
| 0.0599332 | 0.0095892 | −0.0086243 | 0.5898750 | 0.0215266 | −0.0027665 |
| 0.0699296 | 0.0102029 | −0.0090668 | 0.5998754 | 0.0216413 | −0.0021860 |
| 0.0799251 | 0.0107525 | −0.0094574 | 0.6098748 | 0.0217469 | −0.0016044 |
| 0.0899226 | 0.0112493 | −0.0098069 | 0.6198753 | 0.0218395 | −0.0010299 |
| 0.0999190 | 0.0117049 | −0.0101234 | 0.6298758 | 0.0219141 | −0.0004693 |
| 0.1099165 | 0.0121266 | −0.0104139 | 0.6398762 | 0.0219737 | 0.0000763 |
| 0.1199140 | 0.0125212 | −0.0106814 | 0.6598772 | 0.0220418 | 0.0011105 |
| 0.1299115 | 0.0123929 | −0.0109220 | 0.6698776 | 0.0220443 | 0.0015931 |
| 0.1399089 | 0.0132405 | −0.0111425 | 0.6798781 | 0.0220238 | 0.0020468 |
| 0.1599059 | 0.0138779 | −0.0115255 | 0.6898795 | 0.0219793 | 0.0024684 |
| 0.1699033 | 0.0141775 | −0.0116360 | 0.6998799 | 0.0210979 | 0.0023551 |
| 0.1799018 | 0.0144662 | −0.0118275 | 0.7098814 | 0.0218043 | 0.0032018 |
| 0.1899003 | 0.0147368 | −0.0119590 | 0.7298844 | 0.0215103 | 0.0037801 |
| 0.1998987 | 0.0149965 | −0.0120755 | 0.7398858 | 0.0213168 | 0.0040068 |
| 0.2098973 | 0.0152471 | −0.0121750 | 0.7598898 | 0.0208357 | 0.0043341 |
| 0.2198957 | 0.0154938 | −0.0122546 | 0.7698921 | 0.0205452 | 0.0044357 |
| 0.2298942 | 0.0157355 | −0.0123151 | 0.7798946 | 0.0202197 | 0.0044964 |
| 0.2398936 | 0.0159701 | −0.0123606 | 0.7898971 | 0.0198582 | 0.0045210 |
| 0.2598906 | 0.0164165 | −0.0124006 | 0.7998995 | 0.0194617 | 0.0045106 |
| 0.2698901 | 0.0166302 | −0.0123952 | 0.8099019 | 0.0190302 | 0.0044672 |
| 0.2798885 | 0.0168388 | −0.0123727 | 0.8199054 | 0.0185628 | 0.0043938 |
| 0.2898880 | 0.0170385 | −0.0123333 | 0.8399122 | 0.0175228 | 0.0041579 |
| 0.2998864 | 0.0172332 | −0.0122768 | 0.8599201 | 0.0163328 | 0.0038041 |
| 0.3098859 | 0.0174259 | −0.0122043 | 0.8699245 | 0.0156823 | 0.0035857 |
| 0.3198854 | 0.0176086 | −0.0121218 | 0.8799289 | 0.0149948 | 0.0033364 |
| 0.3298839 | 0.0177832 | −0.0120273 | 0.8899334 | 0.0142703 | 0.0030560 |
| 0.3398833 | 0.0179519 | −0.0119169 | 0.8999378 | 0.0135047 | 0.0027386 |
| 0.3598823 | 0.0182803 | −0.0116489 | 0.9099433 | 0.0126931 | 0.0023733 |
| 0.3698817 | 0.0184440 | −0.0114894 | 0.9199477 | 0.0118326 | 0.0019550 |
| 0.3798812 | 0.0186057 | −0.0113120 | 0.9299541 | 0.0109169 | 0.0014757 |
| 0.3898807 | 0.0187594 | −0.0111186 | 0.9399595 | 0.0099503 | 0.0009393 |
| 0.3998801 | 0.0189101 | −0.0109041 | 0.9599723 | 0.0078831 | −0.0002714 |
| 0.4098796 | 0.0190563 | −0.0106677 | 0.9699787 | 0.0067846 | −0.0009317 |
| 0.4198790 | 0.0191986 | −0.0104123 | 0.9799852 | 0.0056400 | −0.0016221 |
| 0.4298785 | 0.0193353 | −0.0101378 | 0.9899926 | 0.0044324 | −0.0023554 |
| 0.4398780 | 0.0194700 | −0.0098374 | 1.0000000 | 0.0031457 | −0.0031458 |
| 0.4598779 | 0.0197365 | −0.0091675 | | | |

HIGH CAMBER BLADE 40 SECTION

| X/C | Y/C (UPPER) | Y/C (LOWER) | X/C | Y/C (UPPER) | Y/C (LOWER) |
|---|---|---|---|---|---|
| 0.0000000 | 0.0000000 | 0.0000000 | 0.4698775 | 0.0246619 | −0.0135838 |
| 0.0004931 | 0.0013687 | −0.0013288 | 0.4798770 | 0.0247597 | −0.0131464 |
| 0.0009901 | 0.0019079 | −0.0018580 | 0.4898764 | 0.0248545 | −0.0126800 |
| 0.0019852 | 0.0026775 | −0.0026196 | 0.4998770 | 0.0249492 | −0.0121856 |

-continued

HIGH CAMBER BLADE 40 SECTION

| X/C | Y/C (UPPER) | Y/C (LOWER) | X/C | Y/C (UPPER) | Y/C (LOWER) |
|---|---|---|---|---|---|
| 0.0029823 | 0.0032627 | −0.0031970 | 0.5098764 | 0.0250390 | −0.0116662 |
| 0.0049774 | 0.0041720 | −0.0040924 | 0.5198759 | 0.0251228 | −0.0111248 |
| 0.0074726 | 0.0050573 | −0.0049539 | 0.5298764 | 0.0252045 | −0.0105594 |
| 0.0099687 | 0.0057864 | −0.0056532 | 0.5398758 | 0.0252852 | −0.0099690 |
| 0.0199573 | 0.0079358 | −0.0076595 | 0.5598757 | 0.0254247 | −0.0087421 |
| 0.0299498 | 0.0094764 | −0.0090389 | 0.5698752 | 0.0254814 | −0.0081116 |
| 0.0399433 | 0.0107060 | −0.0100954 | 0.5798756 | 0.0255331 | −0.0074701 |
| 0.0599333 | 0.0126324 | −0.0116675 | 0.5898751 | 0.0255788 | −0.0068187 |
| 0.0699287 | 0.0134221 | −0.0122861 | 0.5998756 | 0.0256155 | −0.0061601 |
| 0.0799252 | 0.0141289 | −0.0128337 | 0.6098750 | 0.0256421 | −0.0054996 |
| 0.0899227 | 0.0147686 | −0.0133263 | 0.6198754 | 0.0256547 | −0.0048451 |
| 0.0999192 | 0.0153543 | −0.0137728 | 0.6288759 | 0.0256493 | −0.0042045 |
| 0.1099167 | 0.0158960 | −0.0141833 | 0.6398764 | 0.0256289 | −0.0035789 |
| 0.1199141 | 0.0163987 | −0.0145589 | 0.6598773 | 0.0255370 | −0.0023847 |
| 0.1299116 | 0.0168733 | −0.0149024 | 0.6698778 | 0.0254605 | −0.0018230 |
| 0.1399091 | 0.0173160 | −0.0152180 | 0.6798782 | 0.0253600 | −0.0012894 |
| 0.1599060 | 0.0181254 | −0.0157731 | 0.6898797 | 0.0252365 | −0.0007887 |
| 0.1699035 | 0.0185021 | −0.0160106 | 0.6998801 | 0.0250890 | −0.0003260 |
| 0.1799020 | 0.0188638 | −0.0162251 | 0.7098815 | 0.0249114 | 0.0000947 |
| 0.1899005 | 0.0192025 | −0.0164247 | 0.7298844 | 0.0244773 | 0.0008131 |
| 0.1998990 | 0.0195242 | −0.0166032 | 0.7398859 | 0.0242158 | 0.0011078 |
| 0.2098975 | 0.0198319 | −0.0167598 | 0.7598898 | 0.0235977 | 0.0015721 |
| 0.2198959 | 0.0201315 | −0.0168923 | 0.7698922 | 0.0232391 | 0.0017413 |
| 0.2298943 | 0.0204222 | −0.0170019 | 0.7798946 | 0.0228476 | 0.0018685 |
| 0.2398938 | 0.0207009 | −0.0170914 | 0.7898971 | 0.0224231 | 0.0019561 |
| 0.2598907 | 0.0212283 | −0.0172125 | 0.7998996 | 0.0219636 | 0.0020088 |
| 0.2698902 | 0.0214771 | −0.0172421 | 0.8099020 | 0.0214701 | 0.0020274 |
| 0.2798887 | 0.0217168 | −0.0172506 | 0.8199055 | 0.0209396 | 0.0020170 |
| 0.2898881 | 0.0219445 | −0.0172392 | 0.8399123 | 0.0197666 | 0.0019141 |
| 0.2998866 | 0.0221612 | −0.0172048 | 0.8599201 | 0.0184346 | 0.0017023 |
| 0.3098862 | 0.0223719 | −0.0171503 | 0.8699245 | 0.0177111 | 0.0015570 |
| 0.3198856 | 0.0225706 | −0.0170839 | 0.8799290 | 0.0169496 | 0.0013816 |
| 0.3298841 | 0.0227583 | −0.0170024 | 0.8899334 | 0.0161500 | 0.0011763 |
| 0.3398835 | 0.0229390 | −0.0169040 | 0.8999379 | 0.0153094 | 0.0009339 |
| 0.3598824 | 0.0232795 | −0.0166481 | 0.9099433 | 0.0144218 | 0.0006446 |
| 0.3698819 | 0.0234422 | −0.0164877 | 0.9199477 | 0.0134882 | 0.0002994 |
| 0.3798814 | 0.0236000 | −0.0163063 | 0.9299542 | 0.0124995 | −0.0001069 |
| 0.3898808 | 0.0237467 | −0.0161059 | 0.9399595 | 0.0114589 | −0.0005692 |
| 0.3998803 | 0.0238855 | −0.0158795 | 0.9599723 | 0.0092436 | −0.0016318 |
| 0.4098798 | 0.0240173 | −0.0156281 | 0.9699787 | 0.0080709 | −0.0022181 |
| 0.4198792 | 0.0241390 | −0.0153527 | 0.9799851 | 0.0068533 | −0.0028354 |
| 0.4298787 | 0.0242518 | −0.0150544 | 0.9899926 | 0.0055687 | −0.0034917 |
| 0.4398782 | 0.0243596 | −0.0147270 | 1.0000000 | 0.0041920 | −0.0041920 |
| 0.4598780 | 0.0245631 | −0.0139942 | | | |

HIGH CAMBER BLADE 60 SECTION

| X/C | Y/C (UPPER) | Y/C (LOWER) | X/C | Y/C (UPPER) | Y/C (LOWER) |
|---|---|---|---|---|---|
| 0.0000000 | 0.0000000 | 0.0000000 | 0.4698784 | 0.0354458 | −0.0215989 |
| 0.0004931 | 0.0018908 | −0.0018408 | 0.4798778 | 0.0355185 | −0.0210028 |
| 0.0009902 | 0.0027209 | −0.0026570 | 0.4898773 | 0.0355853 | −0.0203666 |
| 0.0019853 | 0.0039125 | −0.0038387 | 0.4998778 | 0.0356441 | −0.0196903 |
| 0.0029824 | 0.0048152 | −0.0047315 | 0.5098772 | 0.0356959 | −0.0189791 |
| 0.0049776 | 0.0061990 | −0.0060995 | 0.5198767 | 0.0357366 | −0.0182369 |
| 0.0074727 | 0.0075355 | −0.0074063 | 0.5298771 | 0.0357733 | −0.0174646 |
| 0.0099689 | 0.0086322 | −0.0084672 | 0.5398766 | 0.0358060 | −0.0166584 |
| 0.0199575 | 0.0118539 | −0.0115100 | 0.5598765 | 0.0358295 | −0.0149739 |
| 0.0299501 | 0.0141534 | −0.0136065 | 0.5698760 | 0.0358153 | −0.0141007 |
| 0.0399437 | 0.0159789 | −0.0152171 | 0.5798764 | 0.0357869 | −0.0132073 |
| 0.0599337 | 0.0188293 | −0.0176216 | 0.5898759 | 0.0357525 | −0.0123000 |
| 0.0699292 | 0.0199910 | −0.0185724 | 0.5998763 | 0.0357111 | −0.0113896 |
| 0.0799257 | 0.0210287 | −0.0194111 | 0.6098757 | 0.0356499 | −0.0104694 |
| 0.0899233 | 0.0219685 | −0.0210639 | 0.6198762 | 0.0355497 | −0.0095382 |
| 0.0999197 | 0.0228251 | −0.0208496 | 0.6298767 | 0.0354094 | −0.0086009 |
| 0.1099173 | 0.0238178 | −0.0214753 | 0.6398772 | 0.0352349 | −0.0076715 |
| 0.1199147 | 0.0243524 | −0.0220510 | 0.6598780 | 0.0348227 | −0.0058813 |
| 0.1299122 | 0.0250410 | −0.0225787 | 0.6698785 | 0.0345929 | −0.0050466 |
| 0.1399097 | 0.0256857 | −0.0230644 | 0.6798789 | 0.0343531 | −0.0042638 |
| 0.1599066 | 0.0268600 | −0.0239208 | 0.6898804 | 0.0340993 | −0.0335370 |
| 0.1699042 | 0.0274066 | −0.0242905 | 0.6998808 | 0.0388196 | −0.0028663 |
| 0.1799027 | 0.0279262 | −0.0246292 | 0.7098822 | 0.0335069 | −0.0022467 |
| 0.1899012 | 0.0284159 | −0.0249419 | 0.7298852 | 0.0327646 | −0.0011506 |
| 0.1998996 | 0.0288795 | −0.0252266 | 0.7398865 | 0.0323261 | −0.0086691 |

-continued

HIGH CAMBER BLADE 60 SECTION

| X/C | Y/C (UPPER) | Y/C (LOWER) | X/C | Y/C (UPPER) | Y/C (LOWER) |
|---|---|---|---|---|---|
| 0.2098982 | 0.0293222 | −0.0254803 | 0.7598904 | 0.0313029 | 0.0001620 |
| 0.2198966 | 0.0297479 | −0.0256970 | 0.7698929 | 0.0307182 | 0.0005076 |
| 0.2298951 | 0.0301575 | −0.0258817 | 0.7798952 | 0.0300876 | 0.0008072 |
| 0.2398946 | 0.0305492 | −0.0260384 | 0.7898977 | 0.0294129 | 0.0010608 |
| 0.2598915 | 0.0312805 | −0.0262618 | 0.7999002 | 0.0286962 | 0.0012703 |
| 0.2698910 | 0.0316222 | −0.0263266 | 0.8099025 | 0.0279356 | 0.0014359 |
| 0.2798895 | 0.0319469 | −0.0263623 | 0.8199060 | 0.0271339 | 0.0015645 |
| 0.2898889 | 0.0322536 | −0.0263701 | 0.8399128 | 0.0253936 | 0.0017036 |
| 0.2998874 | 0.0325443 | −0.0263498 | 0.8599206 | 0.0234652 | 0.0017088 |
| 0.3098869 | 0.0328250 | −0.0262975 | 0.8699250 | 0.0224305 | 0.0016544 |
| 0.3198863 | 0.0330857 | −0.0262253 | 0.8799294 | 0.0213517 | 0.0015621 |
| 0.3298848 | 0.0333273 | −0.0261320 | 0.8899338 | 0.0202319 | 0.0014287 |
| 0.3398843 | 0.0335570 | −0.0260127 | 0.8999382 | 0.0190641 | 0.0012414 |
| 0.3598832 | 0.0339824 | −0.0256942 | 0.9099436 | 0.0178432 | 0.0009912 |
| 0.3698827 | 0.0341841 | −0.0254889 | 0.9199480 | 0.0165664 | 0.0006709 |
| 0.3798822 | 0.0343728 | −0.0252567 | 0.9299544 | 0.0152215 | 0.0002703 |
| 0.3898816 | 0.0345476 | −0.0249944 | 0.9399598 | 0.0138147 | −0.0001997 |
| 0.3998811 | 0.0347063 | −0.0245983 | 0.9599725 | 0.0108329 | −0.0013182 |
| 0.4098806 | 0.0348501 | −0.0243631 | 0.9699789 | 0.0092700 | −0.0019525 |
| 0.4198800 | 0.0349769 | −0.0239949 | 0.9799852 | 0.0076571 | −0.0026348 |
| 0.4298795 | 0.0350887 | −0.0235897 | 0.9899927 | 0.0059812 | −0.0033820 |
| 0.4398790 | 0.0351895 | −0.0231495 | 1.0000000 | 0.0042222 | −0.0012223 |
| 0.4598789 | 0.0353670 | −0.0221551 | | | |

HIGH CAMBER BLADE 75 SECTION

| X/C | Y/C (UPPER) | Y/C (LOWER) | X/C | Y/C (UPPER) | Y/C (LOWER) |
|---|---|---|---|---|---|
| 0.0000000 | 0.0000000 | 0.0000000 | 0.4698793 | 0.0439668 | −0.0273502 |
| 0.0004932 | 0.0020955 | −0.0020356 | 0.4798787 | 0.0440356 | −0.0266162 |
| 0.0009902 | 0.0031840 | −0.0031081 | 0.4898782 | 0.0440973 | −0.0258352 |
| 0.0019854 | 0.0047591 | −0.0046714 | 0.4998786 | 0.0441490 | −0.0250041 |
| 0.0029825 | 0.0059405 | −0.0058409 | 0.5098781 | 0.0441898 | −0.0241301 |
| 0.0049777 | 0.0077050 | −0.0075857 | 0.5198776 | 0.0442165 | −0.0232181 |
| 0.0074729 | 0.0093899 | −0.0092349 | 0.5298780 | 0.0442351 | −0.0222659 |
| 0.0099691 | 0.0107702 | −0.0105715 | 0.5398775 | 0.0442478 | −0.0212719 |
| 0.0199579 | 0.0148124 | −0.0143989 | 0.5598774 | 0.0442262 | −0.0192007 |
| 0.0299505 | 0.0176898 | −0.0170336 | 0.5698768 | 0.0441858 | −0.0181296 |
| 0.0399441 | 0.0199712 | −0.0190563 | 0.5798773 | 0.0441333 | −0.0170383 |
| 0.0599342 | 0.0235265 | −0.0220781 | 0.5898768 | 0.0440758 | −0.0159340 |
| 0.0699297 | 0.0249762 | −0.0232730 | 0.5998772 | 0.0440162 | −0.0148317 |
| 0.0799263 | 0.0262718 | −0.0243300 | 0.6098767 | 0.0439389 | −0.0137236 |
| 0.0899239 | 0.0274435 | −0.0252789 | 0.6198772 | 0.0438235 | −0.0126094 |
| 0.0999203 | 0.0285131 | −0.0261417 | 0.6298775 | 0.0436631 | −0.0114943 |
| 0.1099179 | 0.0294997 | −0.0269296 | 0.6398780 | 0.0434636 | −0.0103880 |
| 0.1199154 | 0.0304143 | −0.0276535 | 0.6598789 | 0.0429694 | −0.0082402 |
| 0.1299129 | 0.0312728 | −0.0283173 | 0.6698793 | 0.0426737 | −0.0072178 |
| 0.1399104 | 0.0320764 | −0.0289301 | 0.6798798 | 0.0423440 | −0.0062374 |
| 0.1599074 | 0.0335446 | −0.0300169 | 0.6898812 | 0.0419742 | −0.0053009 |
| 0.1699049 | 0.0342241 | −0.0304857 | 0.6998816 | 0.0415576 | −0.0044135 |
| 0.1799034 | 0.0348687 | −0.0309116 | 0.7098831 | 0.0410869 | −0.0035760 |
| 0.1899019 | 0.0354743 | −0.0313064 | 0.7298859 | 0.0399884 | −0.0028521 |
| 0.1999004 | 0.0360469 | −0.0316643 | 0.7398874 | 0.0393587 | −0.0013717 |
| 0.2098989 | 0.0365945 | −0.0319851 | 0.7598912 | 0.0379322 | −0.0001757 |
| 0.2198973 | 0.0371230 | −0.0322630 | 0.7698935 | 0.0371343 | 0.0003368 |
| 0.2298959 | 0.0376316 | −0.0325008 | 0.7798960 | 0.0362805 | 0.0007933 |
| 0.2398953 | 0.0381163 | −0.0327027 | 0.7898984 | 0.0353727 | 0.0011958 |
| 0.2598923 | 0.0390215 | −0.0329984 | 0.7999008 | 0.0344139 | 0.0015454 |
| 0.2698919 | 0.0394441 | −0.0330904 | 0.8099031 | 0.0334041 | 0.0018419 |
| 0.2798902 | 0.0398447 | −0.0331443 | 0.8199065 | 0.0323452 | 0.0020914 |
| 0.2898898 | 0.0402204 | −0.0331612 | 0.8399134 | 0.0300784 | 0.0024436 |
| 0.2998883 | 0.0405750 | −0.0331411 | 0.8599210 | 0.0276086 | 0.0025988 |
| 0.3098877 | 0.0409157 | −0.0330830 | 0.8699255 | 0.0263026 | 0.0025994 |
| 0.3198872 | 0.0412313 | −0.0329998 | 0.8799298 | 0.0249555 | 0.0025411 |
| 0.3298857 | 0.0415269 | −0.0328927 | 0.8899342 | 0.0235714 | 0.0024199 |
| 0.3398852 | 0.0418065 | −0.0327536 | 0.8999386 | 0.0221404 | 0.0022256 |
| 0.3598841 | 0.0423228 | −0.0323764 | 0.9099439 | 0.0206503 | 0.0019503 |
| 0.3698836 | 0.0425635 | −0.0321303 | 0.9199483 | 0.0190893 | 0.0015939 |
| 0.3798831 | 0.0427871 | −0.0318473 | 0.9299546 | 0.0174442 | 0.0011456 |
| 0.3898826 | 0.0429899 | −0.0315273 | 0.9399599 | 0.0157192 | 0.0006172 |
| 0.3998820 | 0.0431696 | −0.0311603 | 0.9599727 | 0.0120770 | −0.0006593 |
| 0.1098815 | 0.0433324 | −0.0307483 | 0.9699789 | 0.0101818 | −0.0014016 |
| 0.4198809 | 0.0434751 | −0.0302963 | 0.9799853 | 0.0082487 | −0.0022218 |
| 0.4298804 | 0.0435999 | −0.0298023 | 0.9899927 | 0.0062664 | −0.0031490 |

-continued

| | | HIGH CAMBER BLADE 75 SECTION | | | |
|---|---|---|---|---|---|
| X/C | Y/C (UPPER) | Y/C (LOWER) | X/C | Y/C (UPPER) | Y/C (LOWER) |
| 0.4398798 | 0.0437086 | −0.0292603 | 1.0000000 | 0.0042183 | −0.0042183 |
| 0.4598798 | 0.0438891 | −0.0280352 | | | |

| | | LOW CAMBER BLADE SECTION 20 | | | |
|---|---|---|---|---|---|
| X/C | Y/C (UPPER) | Y/C (LOWER) | X/C | Y/C (UPPER) | Y/C (LOWER) |
| 0.0000000 | 0.0000000 | 0.0000000 | 0.4698768 | 0.0116725 | −0.0075184 |
| 0.0004930 | 0.0006864 | −0.0006714 | 0.4798762 | 0.0116860 | −0.0073311 |
| 0.0009901 | 0.0009549 | −0.0009360 | 0.4898757 | 0.0116984 | −0.0071329 |
| 0.0019851 | 0.0013387 | −0.0013168 | 0.4998761 | 0.0117078 | −0.0069216 |
| 0.0029822 | 0.0016309 | −0.0016060 | 0.5098756 | 0.0117143 | −0.0066993 |
| 0.0049773 | 0.0020840 | −0.0020542 | 0.5198751 | 0.0117167 | −0.0064671 |
| 0.0074724 | 0.0025247 | −0.0024859 | 0.5298756 | 0.0117181 | −0.0062258 |
| 0.0099685 | 0.0028878 | −0.0028381 | 0.5398750 | 0.0117180 | −0.0059740 |
| 0.0199570 | 0.0039550 | −0.0038516 | 0.5598750 | 0.0117034 | −0.0054470 |
| 0.0299494 | 0.0047173 | −0.0045533 | 0.5698743 | 0.0116883 | −0.0051742 |
| 0.0399429 | 0.0053217 | −0.0050930 | 0.5798748 | 0.0116692 | −0.0048954 |
| 0.0599329 | 0.0062655 | −0.0059034 | 0.5898743 | 0.0116471 | −0.0046116 |
| 0.0699282 | 0.0066514 | −0.0062257 | 0.5998748 | 0.0116215 | −0.0043253 |
| 0.0799247 | 0.0069954 | −0.0065099 | 0.6098742 | 0.0115914 | −0.0040375 |
| 0.0899222 | 0.0073063 | −0.0067651 | 0.6198747 | 0.0115552 | −0.0037517 |
| 0.0999187 | 0.0075902 | −0.0069974 | 0.6298751 | 0.0115136 | −0.0034714 |
| 0.1099162 | 0.0078521 | −0.0072096 | 0.6398756 | 0.0114659 | −0.0031970 |
| 0.1199136 | 0.0080960 | −0.0074058 | 0.6598765 | 0.0113486 | −0.0026663 |
| 0.1299111 | 0.0083244 | −0.0075855 | 0.6698770 | 0.0112774 | −0.0024134 |
| 0.1399086 | 0.0085373 | −0.0077507 | 0.6798774 | 0.0111977 | −0.0021711 |
| 0.1599054 | 0.0089281 | −0.0080462 | 0.6898788 | 0.0111105 | −0.0019422 |
| 0.1699029 | 0.0091085 | −0.0081739 | 0.6998793 | 0.0110163 | −0.0017302 |
| 0.1799014 | 0.0092799 | −0.0082906 | 0.7098808 | 0.0109130 | −0.0015353 |
| 0.1898998 | 0.0094413 | −0.0083993 | 0.7298837 | 0.0106761 | −0.0011920 |
| 0.1998983 | 0.0095942 | −0.0084985 | 0.7398852 | 0.0105414 | −0.0010446 |
| 0.2098968 | 0.0097406 | −0.0085882 | 0.7598891 | 0.0102394 | −0.0008003 |
| 0.2198952 | 0.0098820 | −0.0086669 | 0.7698915 | 0.0100717 | −0.0007039 |
| 0.2298937 | 0.0100169 | −0.0087342 | 0.7798940 | 0.0098920 | −0.0006235 |
| 0.2398931 | 0.0101463 | −0.0087929 | 0.7898964 | 0.0097008 | −0.0005587 |
| 0.2598900 | 0.0103846 | −0.0088788 | 0.7998989 | 0.0094956 | −0.0005058 |
| 0.2698895 | 0.0104950 | −0.0089066 | 0.8099014 | 0.0092764 | −0.0004650 |
| 0.2798880 | 0.0106004 | −0.0089253 | 0.8199048 | 0.0090432 | −0.0004341 |
| 0.2898874 | 0.0106993 | −0.0089345 | 0.8399118 | 0.0085339 | −0.0004034 |
| 0.2998859 | 0.0107932 | −0.0089347 | 0.8599196 | 0.0079655 | −0.0004137 |
| 0.3098854 | 0.0108831 | −0.0089250 | 0.8699241 | 0.0076583 | −0.0004328 |
| 0.3198848 | 0.0109680 | −0.0089102 | 0.8799285 | 0.0073356 | −0.0004614 |
| 0.3298833 | 0.0110455 | −0.0088869 | 0.8899330 | 0.0069974 | −0.0004995 |
| 0.3398827 | 0.0111179 | −0.0088546 | 0.8999375 | 0.0066431 | −0.0005516 |
| 0.3598817 | 0.0112517 | −0.0087651 | 0.9099429 | 0.0062724 | −0.0006222 |
| 0.3698812 | 0.0113146 | −0.0087063 | 0.9199474 | 0.0058846 | −0.0007138 |
| 0.3798807 | 0.0113730 | −0.0086381 | 0.9299538 | 0.0054768 | −0.0008294 |
| 0.3898801 | 0.0114255 | −0.0085598 | 0.9399593 | 0.0050511 | −0.0009670 |
| 0.3998795 | 0.0114719 | −0.0084696 | 0.9599722 | 0.0041490 | −0.0012946 |
| 0.4098790 | 0.0115139 | −0.0083678 | 0.9699786 | 0.0036723 | −0.0014772 |
| 0.4198785 | 0.0115513 | −0.0082566 | 0.9799851 | 0.0031760 | −0.0016693 |
| 0.4298779 | 0.0115827 | −0.0081333 | 0.9899926 | 0.0026533 | −0.0018739 |
| 0.4398774 | 0.0116112 | −0.0079991 | 1.0000000 | 0.0020955 | −0.0020955 |
| 0.4598773 | 0.0116551 | −0.0076916 | | | |

| | | LOW CAMBER BLADE SECTION 30 | | | |
|---|---|---|---|---|---|
| X/C | Y/C (UPPER) | Y/C (LOWER) | X/C | Y/C (UPPER) | Y/C (LOWER) |
| 0.0000000 | 0.0000000 | 0.0000000 | 0.4698769 | 0.0171034 | −0.0115649 |
| 0.0004930 | 0.0010253 | −0.0010054 | 0.4798763 | 0.0171093 | −0.0113032 |
| 0.0009901 | 0.0014277 | −0.0014017 | 0.4898759 | 0.0171113 | −0.0110236 |
| 0.0019851 | 0.0020011 | −0.0019712 | 0.4998763 | 0.0171082 | −0.0107269 |
| 0.0029822 | 0.0024361 | −0.0024022 | 0.5098758 | 0.0170981 | −0.0104113 |
| 0.0049773 | 0.0031150 | −0.0030752 | 0.5198752 | 0.0170841 | −0.0100836 |
| 0.0074724 | 0.0037768 | −0.0037251 | 0.5298757 | 0.0170670 | −0.0097429 |
| 0.0099685 | 0.0043192 | −0.0042536 | 0.5398751 | 0.0170459 | −0.0093862 |
| 0.0199570 | 0.0059131 | −0.0057759 | 0.5598750 | 0.0169797 | −0.0086368 |
| 0.0299495 | 0.0070479 | −0.0068291 | 0.5698745 | 0.0169366 | −0.0082501 |

-continued

LOW CAMBER BLADE
SECTION 30

| X/C | Y/C (UPPER) | Y/C (LOWER) | X/C | Y/C (UPPER) | Y/C (LOWER) |
|---|---|---|---|---|---|
| 0.0399430 | 0.0079477 | −0.0076433 | 0.5798749 | 0.0168885 | −0.0078564 |
| 0.0599329 | 0.0093485 | −0.0088650 | 0.5898744 | 0.0168374 | −0.0074557 |
| 0.0699283 | 0.0099184 | −0.0093513 | 0.5998749 | 0.0167782 | −0.0070490 |
| 0.0799248 | 0.0104283 | −0.0097816 | 0.6098743 | 0.0167121 | −0.0066392 |
| 0.0899223 | 0.0108892 | −0.0101670 | 0.6198747 | 0.0166369 | −0.0062325 |
| 0.0999188 | 0.0113091 | −0.0105192 | 0.6298752 | 0.0165537 | −0.0058297 |
| 0.1099163 | 0.0116930 | −0.0108415 | 0.6398757 | 0.0164615 | −0.0054359 |
| 0.1199137 | 0.0120618 | −0.0111408 | 0.6598766 | 0.0162540 | −0.0046772 |
| 0.1299112 | 0.0123997 | −0.0114151 | 0.6698771 | 0.0161348 | −0.0043164 |
| 0.1399086 | 0.0127156 | −0.0116674 | 0.6798775 | 0.0160065 | −0.0039705 |
| 0.1599056 | 0.0132894 | −0.0121140 | 0.6898789 | 0.0158682 | −0.0036427 |
| 0.1699030 | 0.0135552 | −0.0123083 | 0.6998794 | 0.0157170 | −0.0033358 |
| 0.1799015 | 0.0138061 | −0.0124876 | 0.7098809 | 0.0155537 | −0.0030489 |
| 0.1898999 | 0.0140430 | −0.0126529 | 0.7298838 | 0.0151881 | −0.0025421 |
| 0.1998985 | 0.0142669 | −0.0128052 | 0.7398853 | 0.0149863 | −0.0023233 |
| 0.2098969 | 0.0144797 | −0.0129425 | 0.7598892 | 0.0145441 | −0.0019575 |
| 0.2198954 | 0.0146846 | −0.0130638 | 0.7698916 | 0.0142998 | −0.0018096 |
| 0.2298939 | 0.0148805 | −0.0131700 | 0.7798941 | 0.0140406 | −0.0016827 |
| 0.2398933 | 0.0150674 | −0.0132634 | 0.7898965 | 0.0137633 | −0.0015739 |
| 0.2598902 | 0.0154122 | −0.0134050 | 0.7998990 | 0.0134690 | −0.0014821 |
| 0.2698897 | 0.0155721 | −0.0134533 | 0.8099014 | 0.0131558 | −0.0014073 |
| 0.2798881 | 0.0157229 | −0.0134886 | 0.8199049 | 0.0128245 | −0.0013445 |
| 0.2898876 | 0.0158629 | −0.0135089 | 0.8399118 | 0.0121030 | −0.0012618 |
| 0.2998860 | 0.0159938 | −0.0135162 | 0.8599196 | 0.0112995 | −0.0012292 |
| 0.3098855 | 0.0161206 | −0.0135095 | 0.8699241 | 0.0108652 | −0.0012313 |
| 0.3198850 | 0.0162375 | −0.0134928 | 0.8799286 | 0.0104120 | −0.0012465 |
| 0.3298835 | 0.0163444 | −0.0134662 | 0.8899330 | 0.0099397 | −0.0012746 |
| 0.3398829 | 0.0164433 | −0.0134255 | 0.8999375 | 0.0094443 | −0.0013218 |
| 0.3598818 | 0.0166221 | −0.0133071 | 0.9099430 | 0.0089270 | −0.0013929 |
| 0.3698813 | 0.0167060 | −0.0132274 | 0.9199474 | 0.0083866 | −0.0014910 |
| 0.3798807 | 0.0167819 | −0.0131357 | 0.9299538 | 0.0078193 | −0.0016220 |
| 0.3898802 | 0.0163489 | −0.0130281 | 0.9399593 | 0.0072289 | −0.0017821 |
| 0.3998796 | 0.0169018 | −0.0129054 | 0.9599722 | 0.0059802 | −0.0021743 |
| 0.4098791 | 0.0169598 | −0.0127648 | 0.9699786 | 0.0053218 | −0.0023944 |
| 0.4198785 | 0.0170017 | −0.0126091 | 0.9799851 | 0.0046355 | −0.0026266 |
| 0.4298781 | 0.0170366 | −0.0124365 | 0.9899926 | 0.0039141 | −0.0028736 |
| 0.4398776 | 0.0170616 | −0.0122459 | 1.0000000 | 0.0031457 | −0.0031457 |
| 0.4598774 | 0.0170945 | −0.0118095 | | | |

LOW CAMBER BLADE
SECTION 40

| X/C | Y/C (UPPER) | Y/C (LOWER) | X/C | Y/C (UPPER) | Y/C (LOWER) |
|---|---|---|---|---|---|
| 0.0000000 | 0.0000000 | 0.0000000 | 0.4698770 | 0.0218921 | −0.0163536 |
| 0.0004931 | 0.0013587 | −0.0013388 | 0.4798764 | 0.0218561 | −0.0160500 |
| 0.0009901 | 0.0018959 | −0.0018700 | 0.4898759 | 0.0218111 | −0.0157234 |
| 0.0019851 | 0.0026635 | −0.0026336 | 0.4998764 | 0.0217581 | −0.0153768 |
| 0.0029822 | 0.0032468 | −0.0032129 | 0.5098758 | 0.0216960 | −0.0150092 |
| 0.0049773 | 0.0041521 | −0.0041123 | 0.5198753 | 0.0216240 | −0.0146235 |
| 0.0074724 | 0.0050315 | −0.0049798 | 0.5298758 | 0.0215440 | −0.0142199 |
| 0.0099686 | 0.0057526 | −0.0056870 | 0.5398752 | 0.0214569 | −0.0137973 |
| 0.0199571 | 0.0078662 | −0.0077290 | 0.5598751 | 0.0212548 | −0.0129119 |
| 0.0299496 | 0.0093670 | −0.0091483 | 0.5698746 | 0.0211397 | −0.0124533 |
| 0.0399431 | 0.0105528 | −0.0102485 | 0.5798751 | 0.0210176 | −0.0119856 |
| 0.0599330 | 0.0123917 | −0.0119082 | 0.5898745 | 0.0208896 | −0.0115079 |
| 0.0699284 | 0.0131377 | −0.0125706 | 0.5998750 | 0.0207524 | −0.0110232 |
| 0.0799249 | 0.0138046 | −0.0131579 | 0.6098744 | 0.0206073 | −0.0105345 |
| 0.0899224 | 0.0144086 | −0.0136863 | 0.6198748 | 0.0204521 | −0.0100477 |
| 0.0999189 | 0.0149585 | −0.0141686 | 0.6298753 | 0.0202889 | −0.0095649 |
| 0.1099163 | 0.0154684 | −0.0146109 | 0.6398758 | 0.0201167 | −0.0090911 |
| 0.1199138 | 0.0159393 | −0.0150183 | 0.6598766 | 0.0197492 | −0.0081724 |
| 0.1299112 | 0.0163802 | −0.0153956 | 0.6698771 | 0.0195510 | −0.0077326 |
| 0.1399087 | 0.0167911 | −0.0157429 | 0.6798776 | 0.0193427 | −0.0073067 |
| 0.1599057 | 0.0175369 | −0.0163616 | 0.6898790 | 0.0191254 | −0.0068998 |
| 0.1699031 | 0.0178798 | −0.0166329 | 0.6998795 | 0.0188981 | −0.0065169 |
| 0.1799016 | 0.0182037 | −0.0168852 | 0.7098809 | 0.0186608 | −0.0061560 |
| 0.1899000 | 0.0185086 | −0.0171185 | 0.7298838 | 0.0181551 | −0.0055091 |
| 0.1998985 | 0.0187945 | −0.0173329 | 0.7398853 | 0.0178857 | −0.0052222 |
| 0.2098970 | 0.0190644 | −0.0175272 | 0.7598892 | 0.0173061 | −0.0047194 |
| 0.2198954 | 0.0193223 | −0.0177015 | 0.7698916 | 0.0169938 | −0.0045035 |
| 0.2298939 | 0.0195673 | −0.0178568 | 0.7798941 | 0.0166684 | −0.0043106 |
| 0.2398933 | 0.0197982 | −0.0179942 | 0.7898966 | 0.0167282 | −0.0041383 |
| 0.2598903 | 0.0202240 | −0.0182168 | 0.7998990 | 0.0159709 | −0.0039839 |
| 0.2698898 | 0.0204189 | −0.0183002 | 0.8099015 | 0.0155956 | −0.0038471 |

-continued

| | | LOW CAMBER BLADE SECTION 40 | | | |
|---|---|---|---|---|---|
| X/C | Y/C (UPPER) | Y/C (LOWER) | X/C | Y/C (UPPER) | Y/C (LOWER) |
| 0.2798882 | 0.0206009 | −0.0183665 | 0.8199050 | 0.0152014 | −0.0037213 |
| 0.2898877 | 0.0207688 | −0.0184149 | 0.8399119 | 0.0143469 | −0.0035056 |
| 0.2998862 | 0.0209218 | −0.0184442 | 0.8599197 | 0.0134013 | −0.0033310 |
| 0.3098856 | 0.0210667 | −0.0184556 | 0.8699242 | 0.0128940 | −0.0032601 |
| 0.3198851 | 0.0211996 | −0.0184549 | 0.8799286 | 0.0123667 | −0.0032012 |
| 0.3298836 | 0.0213195 | −0.0184412 | 0.8899331 | 0.0118194 | −0.0031544 |
| 0.3398830 | 0.0214305 | −0.0184126 | 0.8999375 | 0.0112490 | −0.0031265 |
| 0.3598819 | 0.0216213 | −0.0183063 | 0.9099430 | 0.0106556 | −0.0031215 |
| 0.3698814 | 0.0217043 | −0.0182257 | 0.9199474 | 0.0100422 | −0.0031466 |
| 0.3798808 | 0.0217762 | −0.0181300 | 0.9299539 | 0.0094018 | −0.0032046 |
| 0.3898803 | 0.0218372 | −0.0180154 | 0.9399593 | 0.0087374 | −0.0032906 |
| 0.3998798 | 0.0218842 | −0.0178808 | 0.9599722 | 0.0073406 | −0.0035347 |
| 0.4098793 | 0.0219202 | −0.0177252 | 0.9699786 | 0.0066082 | −0.0036808 |
| 0.4198787 | 0.0219422 | −0.0175496 | 0.9799851 | 0.0058488 | −0.0038399 |
| 0.4298782 | 0.0219532 | −0.0173530 | 0.9899926 | 0.0050504 | −0.0040099 |
| 0.4398776 | 0.0219512 | −0.0171354 | 1.0000000 | 0.0041920 | −0.0041920 |
| 0.4598775 | 0.0219211 | −0.0166362 | | | |

| | | LOW CAMBER BLADE SECTION 60 | | | |
|---|---|---|---|---|---|
| X/C | Y/C (UPPER) | Y/C (LOWER) | X/C | Y/C (UPPER) | Y/C (LOWER) |
| 0.0000000 | 0.0000000 | 0.0000000 | 0.4698774 | 0.0319841 | −0.0250606 |
| 0.0004931 | 0.0018783 | −0.0018533 | 0.4798768 | 0.0318896 | −0.0246317 |
| 0.0009901 | 0.0027049 | −0.0026729 | 0.4898763 | 0.0317806 | −0.0241713 |
| 0.0019852 | 0.0038940 | −0.0038571 | 0.4998768 | 0.0316557 | −0.0236788 |
| 0.0029823 | 0.0047943 | −0.0047524 | 0.5098763 | 0.0315167 | −0.0231583 |
| 0.0049774 | 0.0061741 | −0.0061244 | 0.5198756 | 0.0313617 | −0.0226118 |
| 0.0074725 | 0.0075032 | −0.0074386 | 0.5298761 | 0.0311961 | −0.0220418 |
| 0.0099687 | 0.0085909 | −0.0085085 | 0.5398756 | 0.0310191 | −0.0214453 |
| 0.0199572 | 0.0117679 | −0.0115959 | 0.5598755 | 0.0306156 | −0.0201878 |
| 0.0299497 | 0.0140167 | −0.0137432 | 0.5698749 | 0.0303866 | −0.0195293 |
| 0.0399433 | 0.0157885 | −0.0154076 | 0.5798754 | 0.0301420 | −0.0188522 |
| 0.0599332 | 0.0185274 | −0.0179235 | 0.5898749 | 0.0298894 | −0.0181631 |
| 0.0699286 | 0.0196364 | −0.0189270 | 0.5998753 | 0.0296307 | −0.0174700 |
| 0.0799252 | 0.0206243 | −0.0198155 | 0.6098748 | 0.0293548 | −0.0167645 |
| 0.0899227 | 0.0215173 | −0.0206151 | 0.6198751 | 0.0290468 | −0.0160411 |
| 0.0999191 | 0.0223312 | −0.0213435 | 0.6298756 | 0.0287073 | −0.0153030 |
| 0.1099166 | 0.0230821 | −0.0220109 | 0.6398761 | 0.0283441 | −0.0145623 |
| 0.1199141 | 0.0237770 | −0.0226264 | 0.6598770 | 0.0275873 | −0.0131166 |
| 0.1299115 | 0.0244254 | −0.0231943 | 0.6698775 | 0.0272063 | −0.0124332 |
| 0.1399090 | 0.0250303 | −0.0237197 | 0.6798779 | 0.0268308 | −0.0117861 |
| 0.1599060 | 0.0261252 | −0.0246556 | 0.6898793 | 0.0264587 | −0.0111776 |
| 0.1699034 | 0.0266276 | −0.0250695 | 0.6998798 | 0.0260813 | −0.0106046 |
| 0.1799020 | 0.0271020 | −0.0254534 | 0.7098812 | 0.0256918 | −0.0100618 |
| 0.1899004 | 0.0275474 | −0.0258104 | 0.7298841 | 0.0248611 | −0.0090541 |
| 0.1998989 | 0.0279663 | −0.0261398 | 0.7398856 | 0.0244118 | −0.0085833 |
| 0.2098973 | 0.0283617 | −0.0264408 | 0.7598895 | 0.0234366 | −0.0077042 |
| 0.2198958 | 0.0287351 | −0.0267097 | 0.7698919 | 0.0229118 | −0.0072989 |
| 0.2298943 | 0.0290885 | −0.0269506 | 0.7798944 | 0.0223639 | −0.0069165 |
| 0.2398937 | 0.0294215 | −0.0271661 | 0.7898968 | 0.0217945 | −0.0065577 |
| 0.2598907 | 0.0300259 | −0.0275165 | 0.7998993 | 0.0212046 | −0.0062213 |
| 0.2698902 | 0.0302983 | −0.0276505 | 0.8099017 | 0.0205927 | −0.0059070 |
| 0.2798886 | 0.0305508 | −0.0277585 | 0.8199052 | 0.0199593 | −0.0056101 |
| 0.2898881 | 0.0307827 | −0.0278409 | 0.8399121 | 0.0186180 | −0.0050669 |
| 0.2998865 | 0.0309957 | −0.0278984 | 0.8599198 | 0.0171717 | −0.0045847 |
| 0.3098860 | 0.0311931 | −0.0279294 | 0.8699244 | 0.0164093 | −0.0043668 |
| 0.3198854 | 0.0313706 | −0.0279404 | 0.8799288 | 0.0156233 | −0.0041664 |
| 0.3298840 | 0.0315285 | −0.0279308 | 0.8899332 | 0.0148168 | −0.0039864 |
| 0.3398834 | 0.0316709 | −0.0278988 | 0.8999377 | 0.0139877 | −0.0038350 |
| 0.3598824 | 0.0319103 | −0.0277662 | 0.9099431 | 0.0131346 | −0.0037174 |
| 0.3698818 | 0.0320103 | −0.0276627 | 0.9199476 | 0.0122571 | −0.0036385 |
| 0.3798813 | 0.0320938 | −0.0275357 | 0.9299540 | 0.0113485 | −0.0036024 |
| 0.3898807 | 0.0321593 | −0.0273827 | 0.9399594 | 0.0104109 | −0.0036034 |
| 0.3998802 | 0.0322043 | −0.0272003 | 0.9599723 | 0.0084542 | −0.0036969 |
| 0.4098797 | 0.0322284 | −0.0269849 | 0.9699787 | 0.0074406 | −0.0037819 |
| 0.4198791 | 0.0322314 | −0.0267404 | 0.9799851 | 0.0064015 | −0.0038904 |
| 0.4298786 | 0.0322140 | −0.0264645 | 0.9899926 | 0.0053314 | −0.0040318 |
| 0.4398780 | 0.0321795 | −0.0261595 | 1.0000000 | 0.0042222 | −0.0042222 |
| 0.4598779 | 0.0320640 | −0.0254581 | | | |

| | LOW CAMBER BLADE SECTION 75 | | | | |
|---|---|---|---|---|---|
| X/C | Y/C (UPPER) | Y/C (LOWER) | X/C | Y/C (UPPER) | Y/C (LOWER) |
| 0.0000000 | 0.0000000 | 0.0000000 | 0.4698778 | 0.0398127 | −0.0315044 |
| 0.0004931 | 0.0020805 | −0.0020506 | 0.4798772 | 0.0396807 | −0.0309710 |
| 0.0009901 | 0.0031651 | −0.0031271 | 0.4898767 | 0.0395318 | −0.0304007 |
| 0.0019852 | 0.0047372 | −0.0046933 | 0.4998772 | 0.0393628 | −0.0297904 |
| 0.0029823 | 0.0059156 | −0.0058658 | 0.5098766 | 0.0391748 | −0.0291450 |
| 0.0049775 | 0.0076752 | −0.0076155 | 0.5198761 | 0.0389669 | −0.0284677 |
| 0.0074726 | 0.0093511 | −0.0092736 | 0.5298765 | 0.0387428 | −0.0277582 |
| 0.0099688 | 0.0107205 | −0.0106212 | 0.5398759 | 0.0385039 | −0.0270159 |
| 0.0199574 | 0.0147090 | −0.0145023 | 0.5598759 | 0.0379698 | −0.0254571 |
| 0.0299499 | 0.0175257 | −0.0171976 | 0.5698753 | 0.0376718 | −0.0246436 |
| 0.0399435 | 0.0197425 | −0.0192850 | 0.5798758 | 0.0373596 | −0.0238121 |
| 0.0599335 | 0.0231644 | −0.0224402 | 0.5898752 | 0.0370404 | −0.0229695 |
| 0.0699289 | 0.0245504 | −0.0236988 | 0.5998756 | 0.0367201 | −0.0221278 |
| 0.0799254 | 0.0257864 | −0.0248154 | 0.6098751 | 0.0363851 | −0.0212774 |
| 0.0899230 | 0.0269024 | −0.0258201 | 0.6198756 | 0.0360200 | −0.0204130 |
| 0.0999194 | 0.0279202 | −0.0267346 | 0.6298760 | 0.0356209 | −0.0195365 |
| 0.1099169 | 0.0288572 | −0.0275721 | 0.6398764 | 0.0351947 | −0.0186569 |
| 0.1199144 | 0.0297241 | −0.0283437 | 0.6598774 | 0.0342871 | −0.0169225 |
| 0.1299119 | 0.0305339 | −0.0290562 | 0.6698778 | 0.0338097 | −0.0160818 |
| 0.1399093 | 0.0312898 | −0.0297167 | 0.6798782 | 0.0333173 | −0.0152640 |
| 0.1599063 | 0.0326627 | −0.0308988 | 0.6898797 | 0.0328059 | −0.0144692 |
| 0.1699038 | 0.0332895 | −0.0314203 | 0.6998801 | 0.0322716 | −0.0136995 |
| 0.1799023 | 0.0338794 | −0.0319009 | 0.7098815 | 0.0317092 | −0.0129537 |
| 0.1899008 | 0.0344323 | −0.0323484 | 0.7298844 | 0.0305044 | −0.0115362 |
| 0.1998992 | 0.0349512 | −0.0327599 | 0.7398859 | 0.0298619 | −0.0108684 |
| 0.2098978 | 0.0354421 | −0.0331375 | 0.7598898 | 0.0284930 | −0.0096148 |
| 0.2198962 | 0.0359080 | −0.0334780 | 0.7698921 | 0.0277666 | −0.0090310 |
| 0.2298947 | 0.0363489 | −0.0337835 | 0.7798946 | 0.0270121 | −0.0084751 |
| 0.2398941 | 0.0367629 | −0.0340561 | 0.7898971 | 0.0262306 | −0.0079463 |
| 0.2598911 | 0.0375157 | −0.0345042 | 0.7998995 | 0.0254241 | −0.0074444 |
| 0.2698905 | 0.0378557 | −0.0346788 | 0.8099019 | 0.0245926 | −0.0069696 |
| 0.2798890 | 0.0381696 | −0.0348194 | 0.8199053 | 0.0237360 | −0.0065177 |
| 0.2898885 | 0.0384556 | −0.0349260 | 0.8399122 | 0.0219479 | −0.0056869 |
| 0.2998869 | 0.0387166 | −0.0349996 | 0.8599200 | 0.0200567 | −0.0049531 |
| 0.3098864 | 0.0389575 | −0.0350411 | 0.8699245 | 0.0190771 | −0.0046261 |
| 0.3198859 | 0.0391734 | −0.0350577 | 0.8799289 | 0.0180813 | −0.0043330 |
| 0.3298844 | 0.0393683 | −0.0350513 | 0.8899333 | 0.0170736 | −0.0040780 |
| 0.3398838 | 0.0395433 | −0.0350168 | 0.8999377 | 0.0160489 | −0.0038659 |
| 0.3598828 | 0.0398362 | −0.0348630 | 0.9099432 | 0.0150002 | −0.0036999 |
| 0.3698822 | 0.0399552 | −0.0347386 | 0.9199476 | 0.0139185 | −0.0035769 |
| 0.3798817 | 0.0400522 | −0.0345822 | 0.9299541 | 0.0127968 | −0.0035019 |
| 0.3898811 | 0.0401242 | −0.0343929 | 0.9399595 | 0.0116351 | −0.0034669 |
| 0.3998805 | 0.0401673 | −0.0341626 | 0.9599723 | 0.0092225 | −0.0035137 |
| 0.4098800 | 0.0401864 | −0.0338943 | 0.9699787 | 0.0079868 | −0.0035966 |
| 0.4198795 | 0.0401804 | −0.0335910 | 0.9799851 | 0.0067419 | −0.0037285 |
| 0.4298790 | 0.0401505 | −0.0332517 | 0.9899926 | 0.0054871 | −0.0039284 |
| 0.4398784 | 0.0400965 | −0.0328723 | 1.0000000 | 0.0042183 | −0.0042183 |
| 0.4598783 | 0.0399256 | −0.0319987 | | | |

From the foregoing and referring to FIGS. 1A, 1B, 2A and 2B which illustrate the disclosed airfoil family, it is seen that the airfoils of the present invention are each characterized along substantially the entire length of the chord thereof by an airfoil shape 110 comprising a rounded generally parabolic leading edge portion 115, an intermediate portion 117 having a minimal camber and extending from from the leading edge portion to about the 40% chord, a gradual upper surface pressure recovery surface 120 from the 40% chord to the trailing edge 125, and a concave lower surface 130 from the 40% chord to the trailing edge.

The concave lower surface 130 provides required lift. The relatively large radii of the leading edge portion 115 compared to the NACA 16 Series leading edge minimizes the foreign object damage. The relatively blunt trailing edges 125 minimize blade handling problems compared to the NACA 16 Series trailing edges.

Each airfoil also has a relatively blunt leading edge and trailing edge compared to the NACA series 16 airfoil. Each of the airfoils for the high camber blade is characterized by a relatively thick trailing edges as follows: the 20 section trailing edge thickness ratio is about 0.0042; the 30 section thickness ratio is about 0.0063; the 40 section thickness ratio is about 0.0084; the 60 section thickness ratio is about 0.0084; and the 75 section thickness ratio is about 0.0084. Similarly, each of the airfoils for the low camber blade is characterized by a relatively thick trailing edges as follows: the 20 section trailing edge thickness ratio is about 0.0042; the 30 section thickness ratio is about 0.0063; the 40 section thickness ratio is about 0.0084; the 60 section thickness ratio is about 0.0084; and the 75 section thickness ratio is about 0.0084. The relatively thick trailing edges provide a blade that is easier to construct and handle compared to the NACA 16 blade which has a relatively thin and sharp trailing edge.

As described above, one will note the the blades which incorporate the airfoil family of the present invention are very similar to U.S. Pat. No. 4,834,617 to Wainauski et al. entitled "Airfoiled Blade" (commonly owned by the assignee herein and hereby incorporated by reference). However, a key distinction exists.

Figure 5:
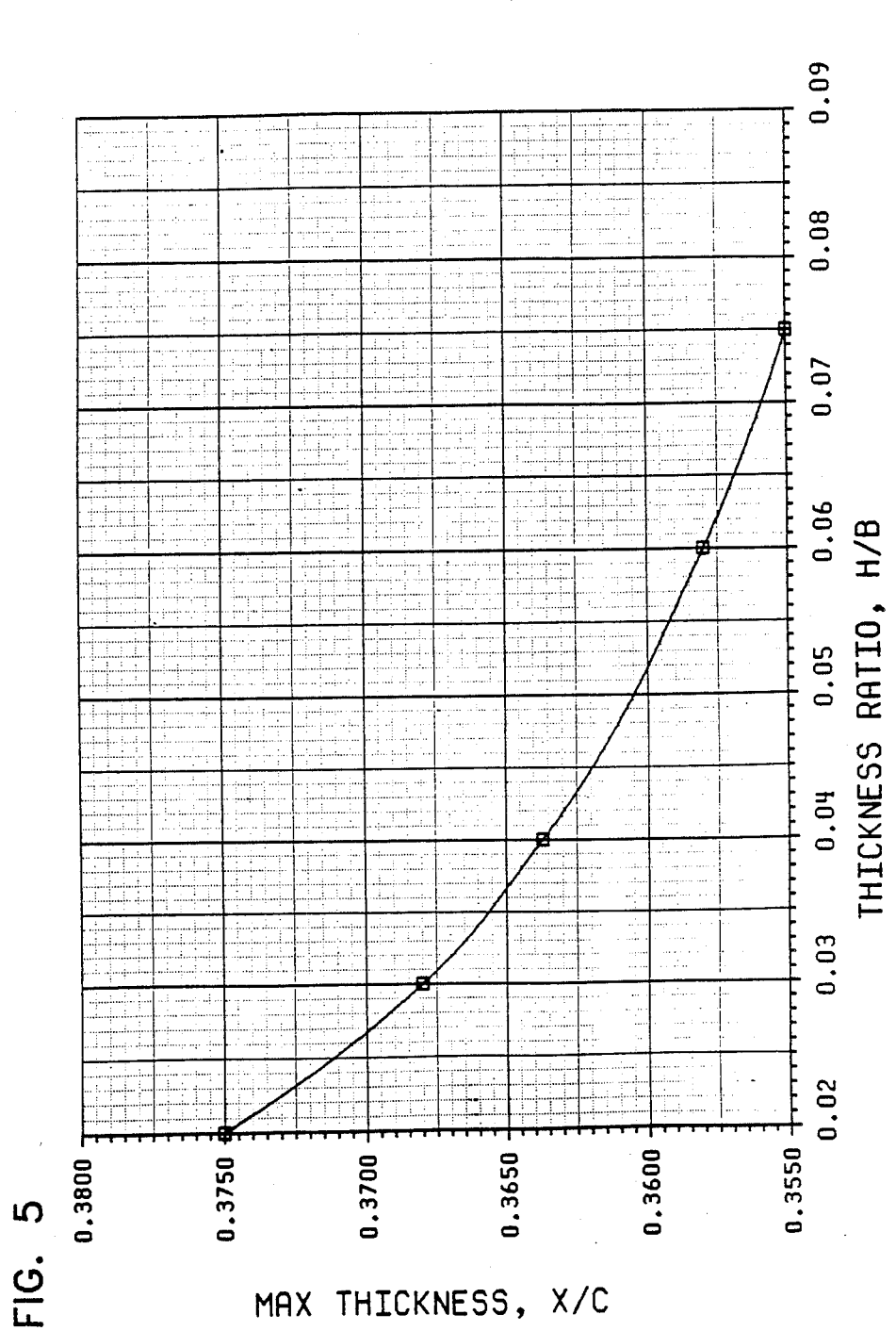
FIG. 5 is a graphical representation of a maximum thickness position with a thickness ratio of a low camber blade employing the concepts of the present invention.
Figure 6:
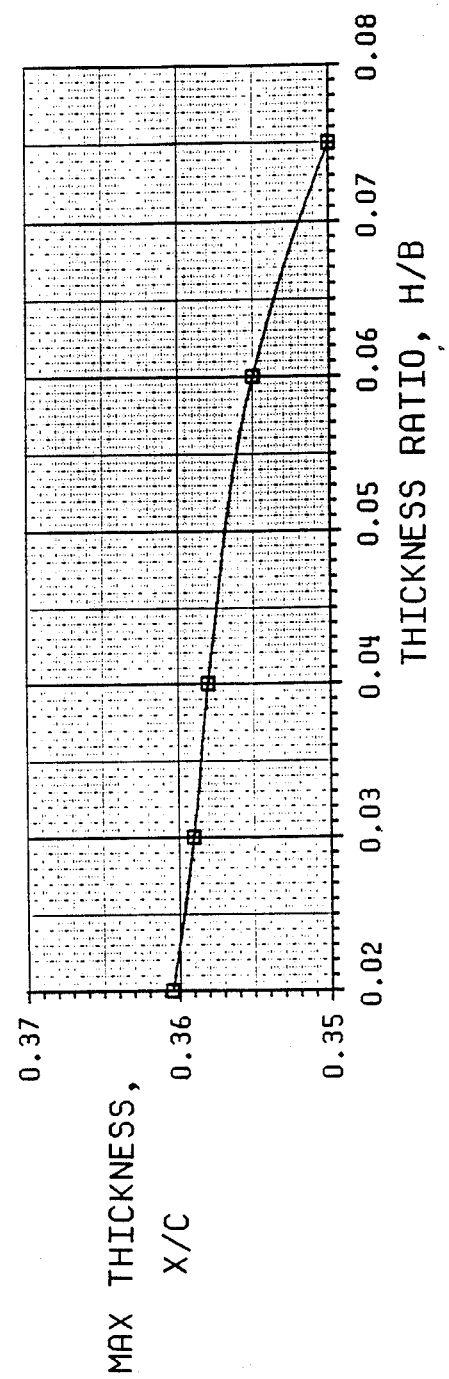
FIG. 6 is a graphical representation of a maximum thickness position with a thickness ratio of a high camber blade employing the concepts of the present invention.

Referring to FIG. 5, it is seen that as the thickness ratio of the high camber blade increases from 2% to 7.5%, the position of maximum thickness of each section is located from about 0.3605 x/c (i.e. or the 36.05% chord) at the 20 section to about 0.350 x/c at the 75 section. Similarly, referring to FIG. 6, it is seen that as the thickness ratio of the low camber blade increases from 2% to 7.5%, the position of maximum thickness of each section is located from about 0.375 x/c at the 20 section to about 0.355 x/c at the 75 section. More generally, the position of maximum thickness of each airfoil is located farther away from the leading edge thereof from the blade root portion to the tip portion. By locating the position of the maximum thickness away from the airfoil section leading edge from the root of the blade towards the tip, boundary layer separation is minimized and a family of airfoils is created.

The camber line of each airfoil section of the airfoil family is minimal from the leading edge of the airfoil to about the 40% chord (minimal is defined as less than a slope of 0.0025). The slope of the camber increases from about the 40% chord to about the 65% chord at about which point the slope diminishes to an apogee at the 74% chord. The slope of the camber diminishes from the apogee to the trailing edge of the section.

Figure 3:
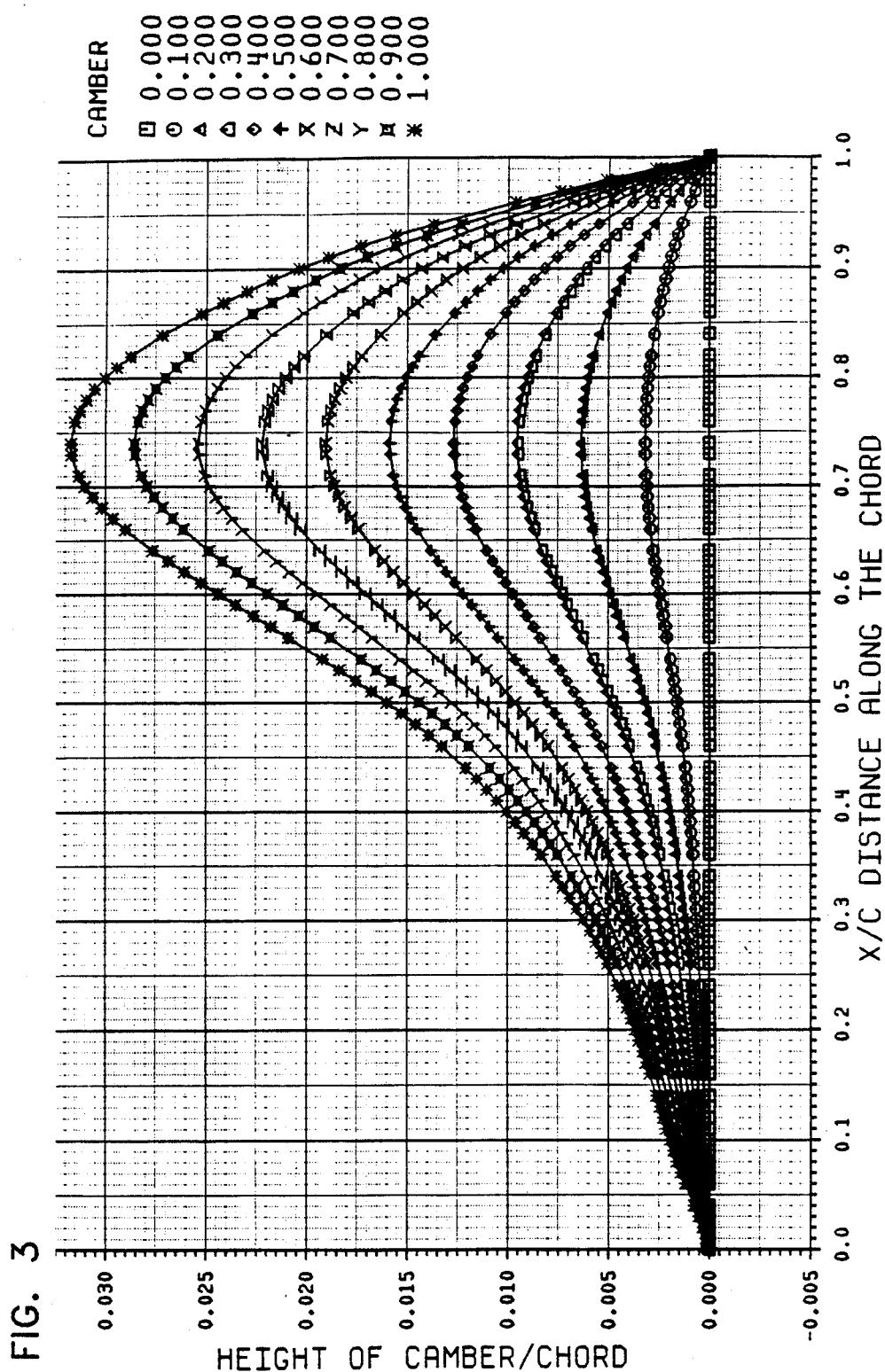
FIG. 3 is a graphical representation of camber lines of airfoil sections of the present invention, x/c being indicative of dimensionless locations on the chord line, y/c being indicative of the dimensionless height of the camber line from the airfoil chord.
Figure 4:
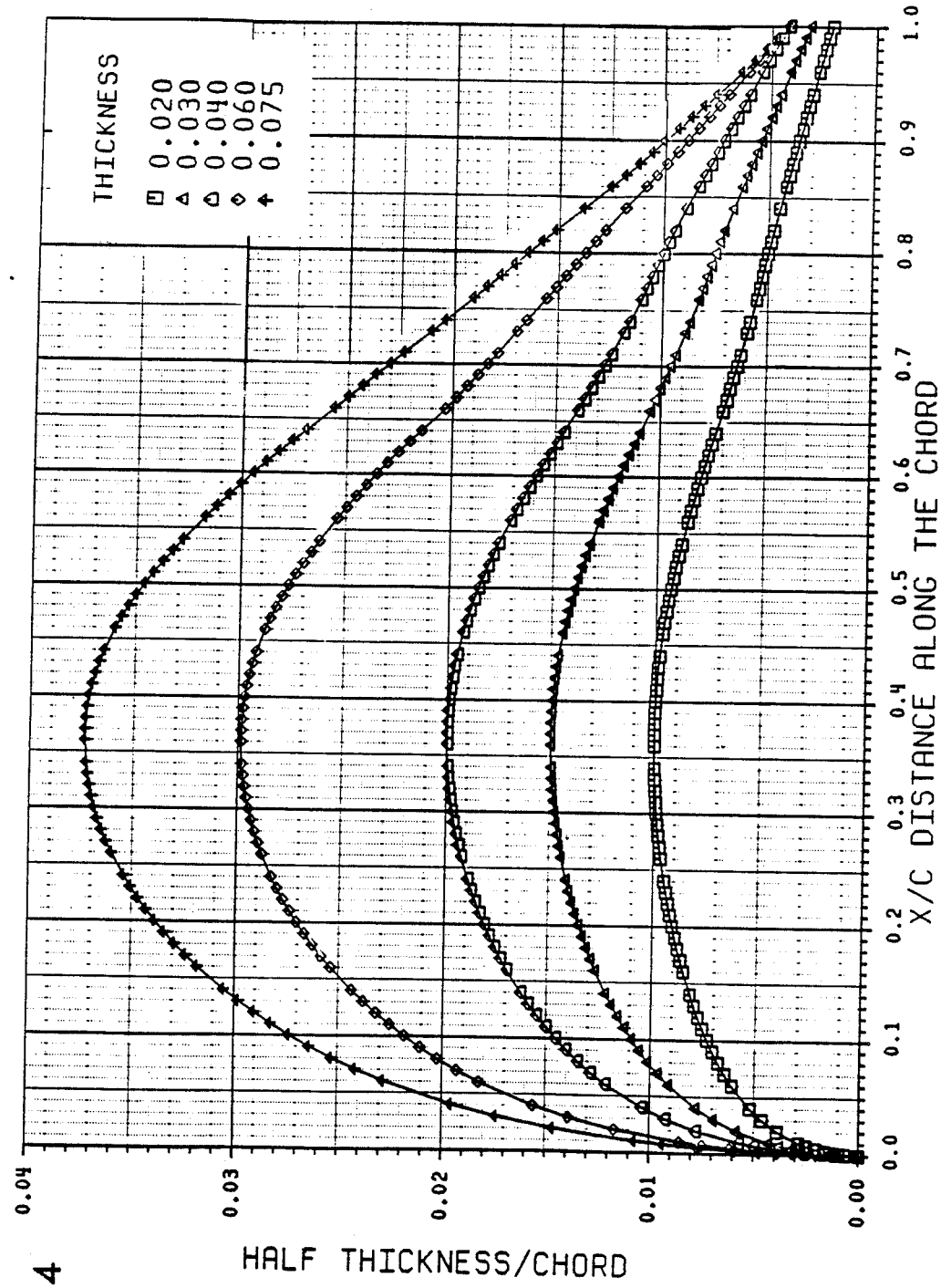
FIG. 4 is a graphical representation of the thickness of the airfoil sections of the present invention, t/c being the dimensionless thickness of the airfoils at corresponding chord locations, x/c.

The chosen camber for each airfoil section of the invention depends generally on the desired lift coefficient for each airfoil section of the family utilized within the blade. As such the camber and desired lift are roughly equivalent, i.e. a high camber blade provides greater lift than a low camber blade. FIG. 3 shows the camber lines that each airfoil may utilize depending on such desired lift coefficient (CLD) of that airfoil. The camber lines may be scaled (i.e. shaped similarly to the camber lines of FIG. 3 but on a different scale) depending on the desired lift coefficient. For instance, for the high camber blade described above; the 20 airfoil section has a desired CLD of about 0.30, the 30 airfoil section has a desired CLD of about 0.40, the 40 airfoil section has a desired CLD of about 0.40, the 60 airfoil section has a desired CLD of about 0.50, and the 75 airfoil section has a desired CLD of about 0.60. Similarly, for the low camber blade described above; the 20 airfoil section has a desired CLD of about 0.15, the 30 airfoil section has a desired CLD of about 0.20, the 40 airfoil section has a desired CLD of about 0.20, the 60 airfoil section has a desired CLD of about 0.25, and the 75 airfoil section has a desired CLD of about 0.30.

The integrated design lift coefficient for each blade represents the average airfoil section CLD weighted by the radial position of the airfoil along the length of the blade cubed. The integrated CLD may range from 0.2 to 0.7 in the instant invention.

Each disclosed thickness ratio may utilize any of the described camber lines or any of a series of scaled camber lines as disclosed herein. Similarly, the thickness ratios for each airfoil section may vary if such thicknesses are scaled from the airfoil sections described and shown above (see FIG. 2).

The high camber blade described above is designed to cruise optimally at about Mach 0.80. However, as is typical in airfoil families, the camber and thickness of each section may be modified to achieve optimum blade loading for other desired mission profiles. For instance the low camber blade is designed to cruise optimally at about Mach 0.85. By utilizing the airfoil family as described above, a particular blade may be designed to operate optimally at mission profiles between Mach 0.72 to Mach 0.85.

The airfoil family of this invention offers the following advantages over conventional airfoils. The relatively blunt leading edges of the airfoil sections minimize foreign object damage and are also easier to manufacture than the sharper leading edges of the NACA Series 16 blades. The relatively blunt trailing edge minimizes blade handling problems. Moreover, because the airfoil sections are part of a family, a blade may be designed to provide optimal loading for a particular mission profile from between Mach 0.72 to 0.85.

Although the invention has been shown and described with respect to a best mode embodiment thereof, it should be understood by those skilled in the art that the foregoing and various other changes, omissions, and additions in the form and detail thereof maybe made therein without departing from the spirit and scope of the invention.

Having thus described the invention what is claimed is:

1. An aircraft propeller blade having a root portion, and a tip portion, said blade comprising:
    a plurality of airfoil sections having a thickness ratio of between 7.5% and 2%;
    each section having along substantially the entire length thereof, a cross sectional shape characterized by;
    a parabolic leading edge,
    a camber having a minimal slope extending from the leading edge to about a 40% chord and having an apogee at a 74% chord,
    a gradual pressure recovery upper surface from about the 40% chord to a trailing edge,
    a concave lower surface from about the 40% chord to the trailing edge to generate life, said upper and lower surfaces merging into a relatively blunt trailing edge, and
    a maximum thickness positioned along the length of each airfoil section from said tip portion to said root portion, said maximum thickness of each airfoil section located from a 37.5% chord for an airfoil at said tip portion to a 35.0% chord at said root portion for an airfoil whereby said propeller blade forms one of an airfoil family.

2. The aircraft propeller blade of claim 1 in which said thickness ratio increases from 2% for an airfoil section at said tip portion of said blade to 7.5% for an airfoil at said root portion of said blade.

3. An airfoil family for use in a propeller blade having a root portion and a tip portion, said blade tapering in thickness from a ratio of 2% at the tip portion of said blade to 7.5% at said root portion of said blade, said family comprising:
    a plurality of airfoil sections each section having across substantially the entire length thereof a cross sectional shape characterized by;
    a parabolic leading edge,
    a camber having a minimal slope extending from the leading edge to about a 40% chord and having an apogee at a 74% chord,
    a gradual pressure recovery upper surface from about the 40% chord to a trailing edge,
    a concave lower surface from about the 40% chord to the trailing edge to generate lift, said upper and lower surfaces merging into a relatively blunt trailing edge, and
    a maximum thickness positioned along the length of each airfoil section as said thickness ratio increases from 2% to 7.5%, said maximum thickness of each airfoil section moves from a 37.5% chord to a 35.0% chord.

4. A family of airfoils for use in a high solidity factor blade having a leading edge portion and a trailing edge portion, said blade tapering in thickness from a tip portion to a root portion, each of said airfoils comprising;
   one of any of a plurality of camber lines extending from said leading edge portion to said trailing edge portion, said camber lines being scalable relative to each other, each having the same relative shape, said camber lines having a minimal slope from said leading edge to about a 40% chord and an apogee at a 74% chord,
   a thickness ratio which increases from 2% for an airfoil section at said tip portion of said blade to 7.5% for an airfoil section at said root portion of said blade, and
   a maximum thickness position which is located from a 37.5% chord for an airfoil section at said tip portion of said blade to a 35.0% chord for an airfoil section at said root portion of said blade.

5. A family of airfoil sections for use in a high solidity factor blade having a leading edge portion and a trailing edge portion, said blade tapering in thickness from a tip portion to a root portion, said blade being designed for use at velocities from about Mach 0.72 to Mach 0.85, each of said airfoil sections comprising;
   one of any of a plurality of camber lines extending from said leading edge portion to said trailing edge portion, said camber lines being scalable relative to each other, each having the same relative shape, said camber lines having a minimal slope from said leading edge to about a 40% chord and an apogee at a 74% chord,
   a thickness ratio which increases from 2% for an airfoil section at said tip portion of said blade to 7.5% for an airfoil section at said root portion of said blade, and
   a maximum thickness position which is located at a 37.5% chord for an airfoil section at said tip portion of said blade to a 35.0% chord for an airfoil section at said root portion of said blade.

6. A family of airfoil sections for use in a high solidity factor blade having a leading edge portion and a trailing edge portion, a tip portion, and a root portion, each of said airfoil sections comprising;
   one of any of a plurality of camber lines extending from said leading edge portion to said trailing edge portion, said camber lines being scalable relative to each other, each having the same relative shape, said camber lines having a minimal slope from said leading edge to a 40% chord and an apogee at a 74% chord,
   a thickness ratio of between 2% to 7.5%, and
   a maximum thickness position which is located from a 37.5% chord for an airfoil section at said tip portion of said blade to a 35.0% chord for an airfoil section at said root portion of said blade.

7. The family of airfoil sections of claim 6 in which said thickness ratio increases from 2% for an airfoil section at said tip portion of said blade to 7.5% for an airfoil section at said root portion of said blade.

* * * * *